(12) United States Patent
Djelassi

(10) Patent No.: US 9,897,517 B2
(45) Date of Patent: Feb. 20, 2018

(54) METHOD FOR MONITORING A THRUST FAULT OF AN AIRCRAFT TURBOFAN

(71) Applicant: SNECMA, Paris (FR)

(72) Inventor: Cedrik Djelassi, Marolles en Hurepoix (FR)

(73) Assignee: SNECMA, Paris (FR)

( * ) Notice: Subject to any disclaimer, the term of this patent is extended or adjusted under 35 U.S.C. 154(b) by 381 days.

(21) Appl. No.: 14/432,878

(22) PCT Filed: Sep. 27, 2013

(86) PCT No.: PCT/FR2013/052307
§ 371 (c)(1),
(2) Date: Apr. 1, 2015

(87) PCT Pub. No.: WO2014/053752
PCT Pub. Date: Apr. 10, 2014

(65) Prior Publication Data
US 2015/0219528 A1 Aug. 6, 2015

(30) Foreign Application Priority Data
Oct. 3, 2012 (FR) ...................................... 12 59367

(51) Int. Cl.
*F01D 21/00* (2006.01)
*F02C 9/28* (2006.01)
(Continued)

(52) U.S. Cl.
CPC ........... *G01M 15/14* (2013.01); *F01D 21/003* (2013.01); *F02C 9/28* (2013.01); *G01L 5/133* (2013.01);
(Continued)

(58) Field of Classification Search
CPC ......... F01D 21/003; F02C 9/28; G05B 17/02; G01M 15/14; G01L 5/133
See application file for complete search history.

(56) References Cited

U.S. PATENT DOCUMENTS 3,691,356 A * 9/1972 Miller .................. G05D 1/0661
244/181
4,242,864 A * 1/1981 Cornett ..................... F02C 9/48
60/226.1
(Continued)

FOREIGN PATENT DOCUMENTS

EP 1 420 153 A2 5/2004
FR 2 883 330 A1 9/2006

OTHER PUBLICATIONS

International Search Report dated Mar. 12, 2014 in PCT/FR2013/052307 filed Sep. 27, 2013.

*Primary Examiner* — Bryan Bui
(74) *Attorney, Agent, or Firm* — Oblon, McClelland, Maier & Neustadt, L.L.P.

(57) ABSTRACT

A method for monitoring a thrust fault of a turbofan during a modification of the thrust setting of the turbofan, the method including a step of processing the thrust setting via a filtering function and a transient-phase model such as to obtain a modelled thrust, a step of comparing the modelled thrust to the actual thrust such as to determine a thrust difference, a step of comparing the thrust difference to an alarm threshold; and a step of emitting an alarm in the event of exceeding the alarm threshold, wherein at a given iteration, in which the prior modelled thrust is known, the transient-phase model provides a time constant in accordance with the prior modelled thrust, and the filtering function provides a modelled thrust in accordance with the time constant obtained, the prior modelled thrust and the thrust setting.

8 Claims, 4 Drawing Sheets

(51) Int. Cl.
*G05B 17/02* (2006.01)
*G01M 15/14* (2006.01)
*G01L 5/13* (2006.01)

(52) U.S. Cl.
CPC .......... *G05B 17/02* (2013.01); *F05D 2260/80* (2013.01); *F05D 2260/81* (2013.01); *F05D 2260/821* (2013.01); *F05D 2270/335* (2013.01); *F05D 2270/44* (2013.01)

(56) References Cited

U.S. PATENT DOCUMENTS

2004/0123600 A1    7/2004   Brunell et al.
2006/0212281 A1    9/2006   Mathews, Jr. et al.

\* cited by examiner

METHOD FOR MONITORING A THRUST FAULT OF AN AIRCRAFT TURBOFAN

GENERAL TECHNICAL FIELD AND PRIOR ART

The present invention relates to the field of monitoring the thrust of a turbine engine, in particular, a turbojet engine for the propulsion of an aircraft.

Conventionally, an aircraft is propelled by at least two turbojet engines which are mounted respectively on the two wings of the aircraft. To control the thrust of turbojet engines, the pilot of the aircraft conventionally actuates a throttle control lever for each turbojet engine.

The thrust of each turbojet engine is conventionally monitored so as to ensure that the actual thrust of the turbojet engine conforms to the thrust setting chosen by the pilot of the aircraft using the throttle control lever. The effective thrust of a turbojet engine can only be measured indirectly for a turbojet engine. In practice, for a twin-spool turbojet engine comprising a low-pressure spool and a high-pressure spool, monitoring the speed of rotation of the low-pressure spool, also known as "speed N1" to determine the thrust of the turbojet engine is known.

In the present application, in somewhat inaccurate language, the term "thrust measurement" is used to refer to the measurement of a parameter that represents the thrust, for example, the speed of rotation N1 or the parameter EPR (engine pressure ratio).

An immediate solution for measuring a thrust fault of a turbojet engine would be to compare, at all times, the speed $N1_{cons}$ which corresponds to the thrust setting defined by the throttle lever with the effective speed $N1_{EFF}$ measured in real time on the turbojet engine by means of on-board sensors.

In practice, when the pilot orders an increase or reduction of the turbojet engine thrust, the turbojet engine reacts with a latency time which may be approximately a few seconds. During this transient phase, because the latency time may vary, detecting a thrust fault is impossible, which delays the actuation of the UHT (uncontrolled high thrust) and ATTCS (automatic take-off thrust control system) safety systems and is a drawback.

GENERAL DESCRIPTION OF THE INVENTION

In order to eliminate at least some of these drawbacks, the invention relates to a method for monitoring a thrust fault in an aircraft turbojet engine by means of an on-board computer of said aircraft when the thrust setting of said turbojet engine is modified, the effective thrust of the turbojet engine being modified during a transient phase to attain the desired thrust setting, said method comprising:
a step of processing the thrust setting by means of a filtering function and a transient-phase model in order to obtain a modelled thrust;
a step of measuring the effective thrust;
a step of comparing said modelled thrust with said effective thrust in order to determine a thrust difference;
a step of comparing said thrust difference with an alarm threshold; and
a step of emitting an alarm in the event of said alarm threshold being exceeded;
in which method
at a given iteration, in which the prior modelled thrust is known, the transient-phase model supplies a time constant from the prior modelled thrust, and the filtering function supplies a modelled thrust from the time constant obtained, the prior modelled thrust and the thrust setting.

Advantageously, the delay between the effective thrust and the thrust setting is modelled precisely in order to produce a consistent comparison of the two values during the transient phase. Thus, any thrust fault during the transient phase can be detected rapidly and reactively. In particular, if a thrust fault is detected on a turbojet engine, said fault can be corrected with the aid of the other turbojet engine, which is also in its transient phase.

Preferably, the effective thrust is obtained indirectly by measuring the speed of rotation of a rotary spool of the turbojet engine, for example the low-pressure spool. It is self-evident that the parameter EPR (engine pressure ratio) could also be used.

Preferably, the filtering function is initialised when the turbojet engine is started. Equally preferably, the filtering function is initialised depending on the sign of the thrust difference. This type of initialisation allows the risk of false alarms during monitoring of a thrust fault to be limited.

Preferably, during the initialisation, the prior modelled thrust is equal to the effective thrust of the turbojet engine. In this way, a rapid convergence of the transient-phase model is obtained in order to obtain the most relevant time constant at the given iteration.

According to a preferred aspect, the filtering function is a low-pass function, preferably, a transfer function of approximately 2 in order to model the delay of the effective thrust during the transient phase in a relevant way.

Preferably, as the turbojet engine comprises an idle-speed regulating device which is suitable for pre-empting a setting defined by a throttle control lever with an idle speed value depending on determined ambient conditions of the turbojet engine, the method comprises, for monitoring excess thrust, a step of measuring at least one ambient parameter of the turbojet engine in order to define whether the throttle control lever setting is pre-empted by the idle speed value.

The monitoring method thus allows indirect detection of whether the thrust setting of the turbojet engine is defined by the throttle control lever setting or by the idle speed value. This indirect detection of idling, which is not related to the idle-speed regulating device, allows the reliability of the monitoring to be increased by avoiding the use of common modes.

Preferably, the monitoring method comprises the determination of an idle speed value which is modelled by means of an idling model which associates a modelled idle speed value with one or more values of ambient parameters of the turbojet engine.

Preferably, the idling model associates a modelled idle speed value with the ambient pressure of the turbojet engine and/or the ambient temperature of the turbojet engine.

According to an aspect of the invention, the alarm threshold is a threshold that can be parameterised, the turbojet engine comprising means for monitoring the state of at least one auxiliary condition of the turbojet engine, and a penalty parameter is applied to said alarm threshold if an abnormal state of said auxiliary condition is detected. The use of a cluster of indices relating to a thrust fault allows detection sensitivity to be significantly increased. The auxiliary conditions may be diverse (turbojet engine cut-off, pumping, acceleration of the high-pressure shaft, change in the derivative of the thrust difference, etc.).

Preferably, a penalty parameter is applied to said alarm threshold which depends on the criticality of the auxiliary condition being monitored. Thus, if a critical auxiliary condition is in an abnormal state, the alarm threshold is designed to be triggered by the slightest thrust difference. By forming a hierarchy of auxiliary conditions, the alarm threshold is defined in a relevant way, thereby limiting the risk of false alarms while increasing the sensitivity of the monitoring.

DESCRIPTION OF THE DRAWINGS

The invention will be better understood upon reading the following description, given solely by way of example, and with reference to the accompanying drawings in which.

It should be noted that the drawings disclose the invention in a detailed manner for implementing the invention, but said drawings could, of course, be used to better define the invention if need be.

DESCRIPTION OF ONE OR MORE EMBODIMENTS

Figure 1:
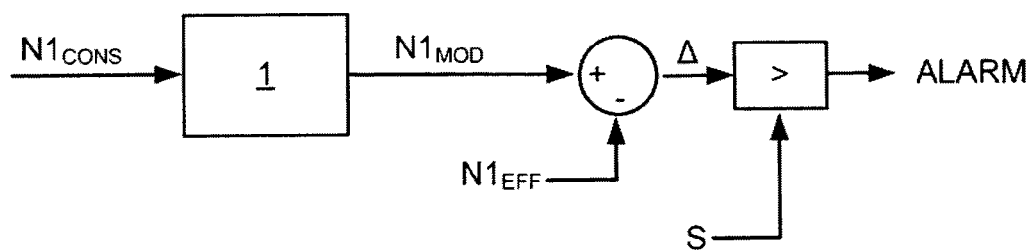
FIG. 1 is a schematic diagram of the method for monitoring the inadequate thrust of a turbojet engine according to the invention.

FIG. 1 is a schematic illustration of a method according to the invention for monitoring a thrust fault of an aircraft turbojet engine by means of an on-board computer of said aircraft when modifying the thrust setting of said turbojet engine.

The invention will be described for a dual-spool turbojet engine comprising a low-pressure spool and a high-pressure spool. For the sake of clarity, the speed of rotation of the low-pressure spool, also referred to as "speed N1", will be used to determine the thrust of the turbojet engine. It is self-evident that other parameters of the turbojet engine which depend on the thrust could also be used, in particular, the parameter EPR (engine pressure ratio).

The thrust setting $N1_{CONS}$ corresponds in this example to the set speed of the low-pressure spool. Preferably, the thrust setting $N1_{CONS}$ is defined by the pilot of the aircraft, on which the turbojet engine is mounted, using a throttle control lever.

Advantageously, the thrust setting $N1_{CONS}$ is known precisely and reliably. The thrust setting $N1_{CONS}$ is redundant, thus ensuring that the monitoring method uses sound, in other words uncorrupted, input. The reliability of the monitoring method according to the invention is therefore improved.

As indicated in the preamble, the effective thrust of the turbojet engine $N1_{EFF}$ is modified during a transient thrust phase until it attains the thrust setting $N1_{CONS}$. The effective thrust $N1_{EFF}$ corresponds, in this example, to the effective speed of the low-pressure spool. Preferably, the effective thrust $N1_{EFF}$ is measured redundantly by sensors of the turbojet engine and is considered to be a sound input.

According to the invention, with reference to FIG. 1, the method comprises:
 a step of processing 1 the thrust setting $N1_{CONS}$ during the transient thrust phase so as to determine a modelled thrust $N1_{MOD}$;
 a step of measuring the effective thrust $N1_{EFF}$;
 a step of comparing said modelled thrust $N1_{MOD}$ with said effective thrust $N1_{EFF}$ so as to determine a thrust difference $\Delta$;
 a step of comparing said thrust difference $\Delta$ with an alarm threshold S; and
 a step of emitting an alarm ALARM should said threshold S be exceeded.

Figure 2:
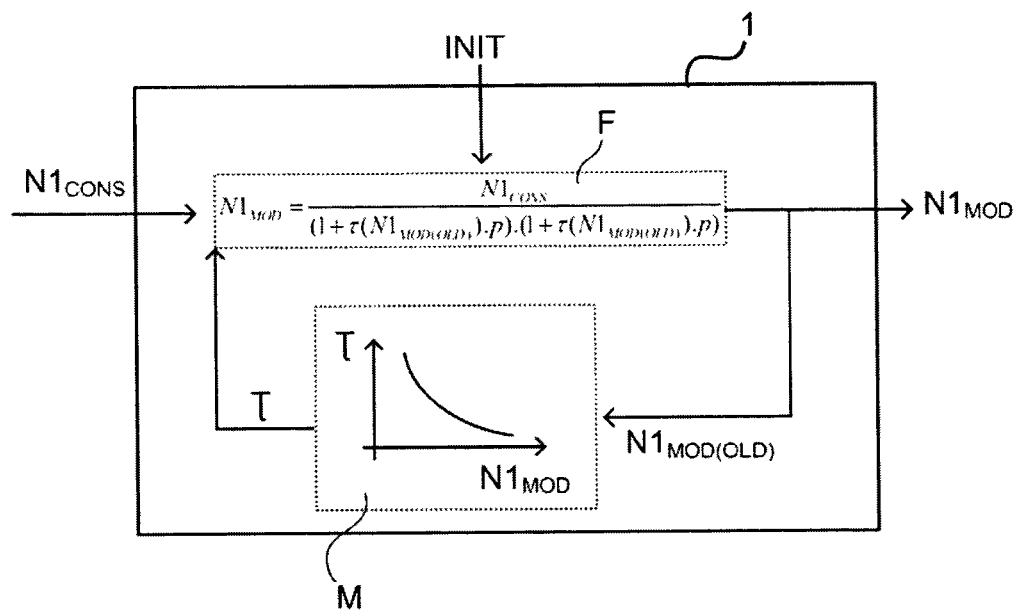
FIG. 2 is a schematic diagram of the step of processing the thrust setting when implementing the method from FIG. 1.

The method is noteworthy in that, during the processing step 1, with reference to FIG. 2, the thrust setting $N1_{CONS}$ is processed using a filtering function F and a transient-phase model M so as to obtain a modelled thrust $N1_{MOD}$.

As shown in FIG. 2, the processing step is iterative. At a given iteration, since a prior modelled thrust $N1_{MOD(OLD)}$ is known, the transient-phase model M supplies a time constant T from the prior modelled thrust $N1_{MOD(OLD)}$, the filtering function F supplies a modelled thrust $N1_{MOD}$ from the time constant obtained T, the prior modelled thrust $N1_{MOD(OLD)}$ and the thrust setting $N1_{CONS}$.

In other words, the invention proposes transforming the thrust setting $N1_{CONS}$ into a modelled thrust $N1_{MOD}$ which takes account of the transient thrust phase of said turbojet engine. Therefore, the modelled thrust $N1_{MOD}$ and the actual thrust $N1_{EFF}$ are correlated during the transient thrust phase, thus allowing them to be compared in a relevant way at all times in the transient phase. This allows any thrust fault (inadequate thrust or excess thrust) to be detected reactively. Therefore it is no longer necessary to wait for the thrust to stabilise in order to detect a thrust fault as in the prior art.

As illustrated in FIG. 2, the thrust setting $N1_{CONS}$ is filtered by a low-pass filtering function F of approximately 2 during the processing step 1. The filtering function F is a transfer function, which is known per se to a person skilled in the art, which allows a modelled thrust $N1_{MOD}$ to be supplied depending on the time constant T in order to allow a comparison with the effective thrust $N1_{EFF}$. Preferably, the filtering function F has a unity gain such that at the end of the transient phase, the modelled thrust $N1_{MOD}$ equals the thrust setting $N1_{CONS}$.

Still with reference to FIG. 2, the transient-phase model M associates a modelled thrust value $N1_{MOD}$ with a time constant value T. The transient-phase model M is conventionally obtained using experience feedback from measurements taken on the same type of turbojet engine. As illustrated in FIG. 2, the modelled thrust $N1_{MOD}$ of a particular iteration is defined from the modelled thrust $N1_{MOD(OLD)}$ obtained at the preceding iteration and the time constant T.

Preferably, the transient-phase model M is different for an increase or reduction of the thrust. Provision is also made for a transient-phase model M for each type of modification of the thrust.

Figure 3:
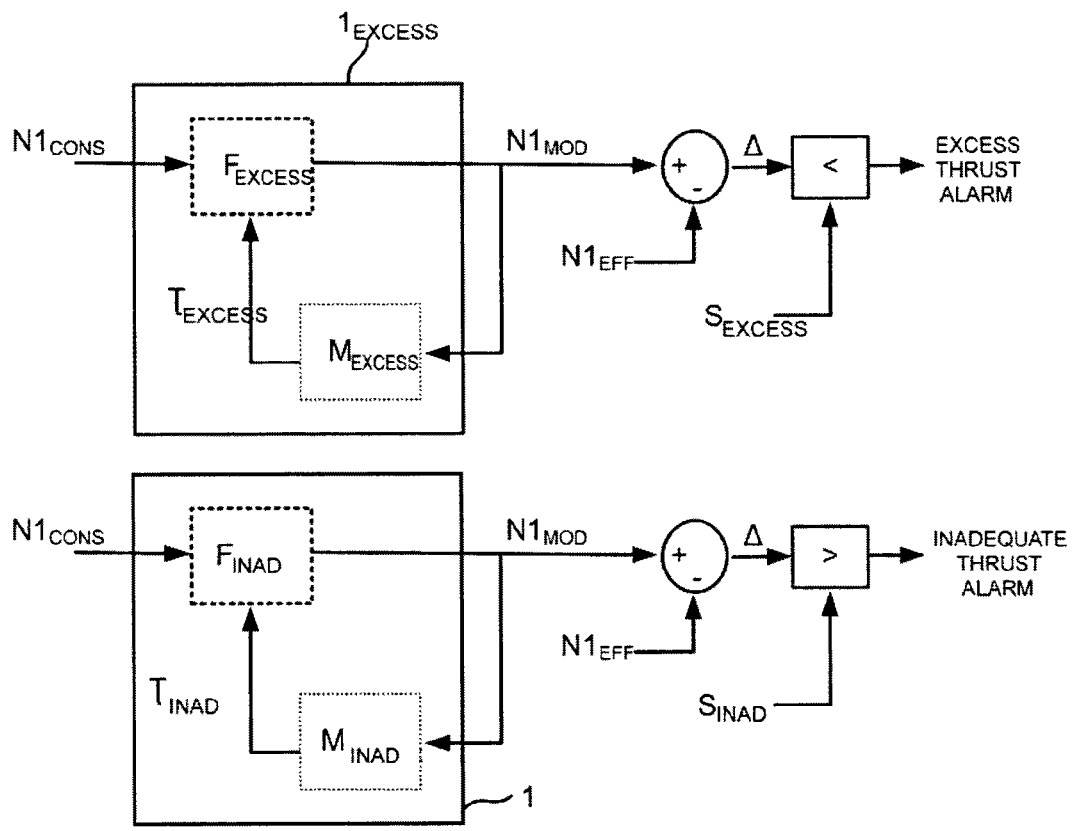
FIG. 3 is a first diagram of monitoring excess thrust and a second diagram of monitoring inadequate thrust.

As illustrated in FIG. 3, the excess thrust and the inadequate thrust of the turbojet engine are monitored by two distinct methods which comprise different processing steps $\mathbf{1}_{EXCESS}$, $\mathbf{1}_{INAD}$ given that they make use of different transient-phase models $M_{EXCESS}$, $M_{INAD}$ and different filtering functions $F_{EXCESS}$, $F_{INAD}$. Similarly, the alarm thresholds are different $S_{EXCESS}$, $S_{INAD}$ depending on the thrust fault being monitored as illustrated in FIG. 3.

For the sake of clarity, the invention is described below for the case of inadequate thrust with reference to the general schematic illustration in FIG. 1.

Preferably, as illustrated in FIG. 2, an initialisation INIT of the filtering function F is carried out, firstly, when starting the turbojet engine and, secondly, depending on the sign of the thrust difference Δ.

Given that the filtering function F is approximately 2, an initialisation allows said filtering function to begin for predetermined modelled thrust values $N1_{MOD(OLD)}$. An initialisation of the filtering function F depending on the sign of the thrust difference Δ makes it possible to prevent a divergence of monitoring methods depending on the type of fault monitored. By way of example, if the effective thrust $N1_{EFF}$ is greater than the modelled thrust $N1_{MOD}$ (the hypothesis of excess thrust), the filtering function $F_{INAD}$ of the method for monitoring the inadequate thrust (see FIG. 3) can be initialised in order to prevent inconsistent results from being supplied, in other words, false alarms. In particular, such an initialisation is advantageous when accelerations are linked to decelerations.

Preferably, during the initialisation, the prior modelled thrust $N1_{MOD(OLD)}$ is equal to the effective thrust $N1_{EFF}$ of the turbojet engine.

Taking Account of the Idle-Speed Regulating Device

According to a preferred aspect of the invention, the turbojet engine comprises an idle-speed regulating device suitable for pre-empting a thrust setting, defined by means of a throttle control lever, by an idle speed value depending on determined ambient conditions of the turbojet engine.

Figure 4:
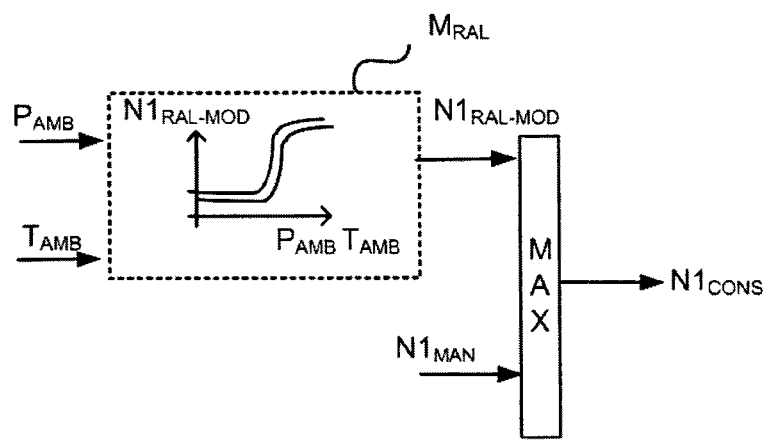
FIG. 4 is a schematic diagram of a step of managing idling when monitoring excess thrust.

For example, with reference to FIG. 4, when the pilot of the aircraft wishes to limit the thrust of the turbojet engine as much as possible, the idle-speed regulating device pre-empts the thrust setting $N1_{MAN}$ defined by the throttle control lever by an idle speed value $N1_{RAL}$ so that the reduction in thrust is not too great for the turbojet engine compared with limitations other than the speed N1 (speed N2, minimal fuel flow rate to limit the risk of cut-off, etc.). The idle speed value $N1_{RAL}$ is not calculated, but results from various limitations of the idle-speed regulating device so as to provide an optimal thermodynamic cycle for the turbojet engine when it decelerates.

However, with regard to the method for monitoring an excess thrust fault according to the invention, the fact that the idle speed value $N1_{RAL}$ corresponds to the thrust setting $N1_{CONS}$ during idling has to be taken into account.

For this purpose, with reference to FIG. 4, in order to monitor excess thrust, the method comprises a step of comparing the lever thrust setting $N1_{MAN}$ with the idle speed value $N1_{RAL}$, the maximum thrust value being used as a thrust setting $N1_{CONS}$ in the above-mentioned processing step 1. In other words, if the thrust setting $N1_{MAN}$ defined by the throttle control lever is greater than the idle speed value $N1_{RAL}$ induced by the idle-speed regulating device, the monitoring method remains in conformity with the embodiment shown in FIG. 1.

However, if the thrust setting $N1_{MAN}$ defined by the throttle control lever is less than the idle speed value $N1_{RAL}$ induced by the idle-speed regulating device, the monitoring method uses the idle speed value $N1_{RAL}$ as a thrust setting $N1_{CONS}$ in the above-mentioned processing step 1.

For the sake of reliability of the monitoring method, it is important to know the idle speed value $N1_{RAL}$ independently of the idle-speed regulating device. Accordingly, the idle speed value is modelled as described below.

In the example in FIG. 4, the idle speed value $N1_{RAL-MOD}$ is obtained from an idling model $M_{RAL}$ that associates a modelled idle speed value $N1_{RAL-MOD}$ with one or more values of ambient parameters of the turbojet engine. However, it is self-evident that the modelled idle speed value $N1_{RAL-MOD}$ could be obtained by other means. By measuring ambient parameters of the turbojet engine which are characteristic of the actuation of the idle-speed regulating device, the idle speed value $N1_{RAL-MOD}$ can be determined indirectly.

In this example, with reference to FIG. 4, the idling model $M_{RAL}$ associates a modelled idle speed value $N1_{RAL-MOD}$ with the ambient pressure $P_{amb}$ of the turbojet engine and the ambient temperature $T_{amb}$ of the turbojet engine. In practice, the ambient parameters $P_{amb}$ and $T_{amb}$ of the turbojet engine are redundant parameters which are considered to be reliable. In particular, these parameters do not have common modes with the thrust faults to be monitored. It is self-evident that other ambient parameters could also be suitable. Similarly to the transient-phase model M, the idling model $M_{RAL}$ is obtained using experience feedback from measurements taken on the same type of turbojet engine.

With reference to FIG. 4, the monitoring method comprises a step of measuring the ambient parameters $P_{amb}$ and $T_{amb}$ of the turbojet engine in order to define the modelled idle speed value $N1_{RAL-MOD}$ with the help of the idling model $M_{RAL}$. Once the modelled idle speed value $N1_{RAL-MOD}$ has been obtained, said value is compared with the thrust setting $N1_{MAN}$ of the control lever, the maximum thrust being used as a thrust setting $N1_{CONS}$ for the processing step 1.

Because the idling is taken into account, the precision with which the excess thrust is monitored is improved. In particular, it makes it possible to avoid excess thrust faults from being declared when the turbojet engine is regulated normally on a high idle speed value.

Variable Alarm Threshold

Figure 5:
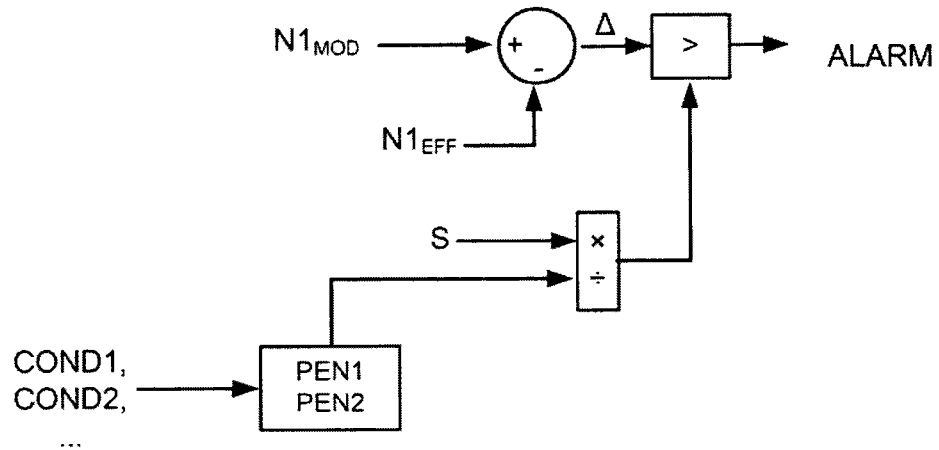
FIG. 5 is a general schematic diagram of the parameterisation of the alarm threshold.

In order to improve the robustness of the monitoring method compared with the dispersions between different turbojet engines of the same type, the alarm threshold S is, preferably, a variable threshold that takes account of auxiliary conditions in order, for example, to reduce the value of the alarm threshold S and thus increase the sensitivity of the detection. In other words, with reference to FIG. 5, the method uses monitoring of at least one auxiliary condition of the turbojet engine COND1, COND2. If a malfunction relating to said auxiliary condition COND1, COND2 is detected, the alarm threshold S is penalised by a penalty parameter PEN1, PEN2 in order to favour rapid detection of a thrust fault.

Preferably, the method implements monitoring of a plurality of auxiliary conditions COND1, COND2 of the turbojet engine. The auxiliary conditions COND1, COND2 are ranked according to their criticality. The more critical the auxiliary condition COND1, COND2, the greater the penalty parameter PEN1, PEN2 of the alarm threshold S. Thus, the threshold S is adaptive to allow a rapid reaction while limiting the risk of false alarms, which is advantageous.

Depending on the type of thrust fault monitored (inadequate thrust or excess thrust), the penalty parameter PEN1, PEN2 can be subtracted/added to the threshold S. It is self-evident that the penalty parameter PEN1, PEN2 could also be in the form of a multiplier coefficient, a mathematical function, etc. Preferably, the penalty parameter PEN1, PEN2 can also depend on the auxiliary condition monitored COND1, COND2 in order to modulate the alarm threshold S progressively.

A plurality of auxiliary conditions will be described below in association with their penalty parameters for monitoring inadequate thrust of a turbojet engine.

a) Measurement of the Speed of Change of the Thrust Difference Δ

Figure 6:
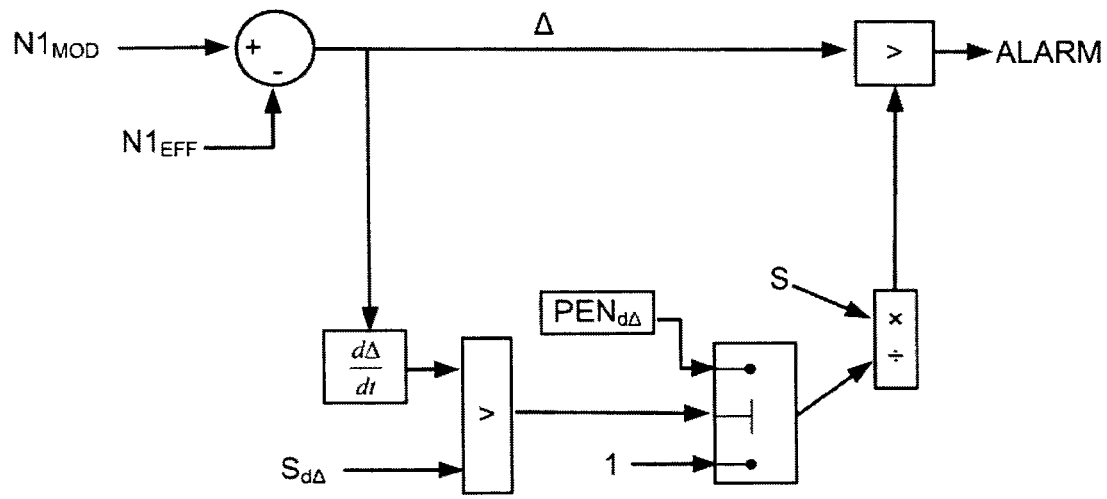
FIG. 6 is a schematic diagram of the parameterisation of the alarm threshold by monitoring the speed of change of the thrust difference.

By way of example, with reference to FIG. 6, the method comprises a step of measuring the speed of change of the thrust difference, that is, the parameter $$\frac{d\Delta}{dt},$$

and a step or comparing the speed of change of the thrust difference $$\frac{d\Delta}{dt}$$

with a predetermined threshold $S_{d\Delta}$.

If the threshold $S_{d\Delta}$, is not exceeded, the alarm threshold is not modified. However, if the threshold $S_{d\Delta}$ is exceeded, the alarm threshold S is reduced by a penalty parameter $PEN_{d\Delta}$, thus having the consequence of making the detection of a thrust fault more sensitive, as illustrated in FIG. 6.

In other words, if the change in the thrust difference Δ is very rapid, it can be concluded that the effective thrust $N1_{EFF}$ of the turbojet engine corresponds less and less to the modelled thrust $N1_{MOD}$, and this is characteristic of a thrust fault.

Preferably, the penalty parameter $PEN_{d\Delta}$ depends on the speed of change of the thrust difference Δ, thus allowing the alarm threshold S to be modulated progressively. By way of example, the penalty parameter $PEN_{d\Delta}$ can be in the form of a coefficient which is equal to 0.5 for a rapid change in the thrust difference Δ and in the form of a coefficient which is equal to 0.2 for a very rapid change in the thrust difference Δ.

b) Measurement of the Speed of the High-Pressure Spool

Figure 7:
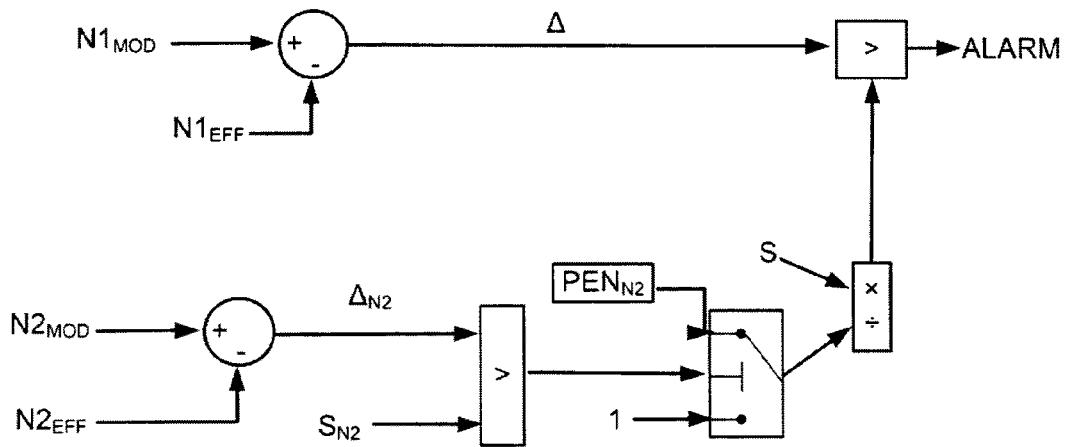
FIG. 7 is a schematic diagram of the parameterisation of the alarm threshold by monitoring the speed of rotation of a high-pressure spool of the turbojet engine.

By way of example, with reference to FIG. 7, the method comprises a step of measuring the speed of the high-pressure spool, that is, the speed N2 of the turbojet engine.

Similarly to the low-pressure spool, the effective speed $N2_{EFF}$ of the high-pressure spool is compared with a modelled speed $N2_{MOD}$ which is determined directly depending on the position of the throttle control lever or indirectly by means of a transient-phase model suitable for the change in speed N2 of the high-pressure spool which is similar to the transient-phase model M described previously.

In other words, a step of measuring the difference $\Delta_{N2}$ between the effective speed $N2_{EFF}$ and the modelled speed $N2_{MOD}$ is carried out and a step of comparing 7 this difference of high pressure speed $\Delta_{N2}$ with a high pressure threshold $S_{N2}$ of predetermined value is carried out as shown in FIG. 7.

If the threshold $S_{N2}$ is not exceeded, the alarm threshold S is not modified. However, if the threshold $S_{N2}$ is exceeded, the alarm threshold S is reduced by a penalty parameter $PEN_{N2}$, thus having the consequence of making the detection of a thrust fault more sensitive.

It can be concluded that the effective speed $N2_{EFF}$ of the turbojet engine corresponds less and less to its modelled speed $N2_{MOD}$, and this is characteristic of a thrust fault.

This type of auxiliary condition makes it possible to increase the reliability of the monitoring. The relationship of the speed N1 over the speed N2 is not linear over time. In particular, the response time of the high-pressure spool is lower than that of the low-pressure spool. Thus, the high-pressure spool accelerates faster at low speed than the low-pressure spool. For this reason, monitoring, firstly, the speed of the low-pressure spool N1 and, secondly, the speed of the high-pressure spool N2, allows optimum monitoring of a thrust fault.

Some turbojet engines are regulated during the transient phases in accordance with a speed setting $N2_{CONS}$ or in accordance with the acceleration in $$\frac{dN2}{dt}.$$

In addition, according to this first hypothesis, a step of measuring the difference between the effective speed $N2_{EFF}$ and the speed setting $N2_{CONS}$ is carried out. In other words, the speed setting $N2_{CONS}$ replaces the modelled speed $N2_{MOD}$. If the turbojet engine is regulated in accordance with the acceleration, the acceleration $$\frac{dN2}{dt}$$

replaces the modelled speed $N2_{MOD}$.

c) Detection of Auxiliary Events

As well as measuring the speed of the low-pressure spool N1 and of the high-pressure spool N2, the turbojet engine may comprise means of detecting auxiliary conditions that could affect the thrust of the turbojet engine.

Figure 8:
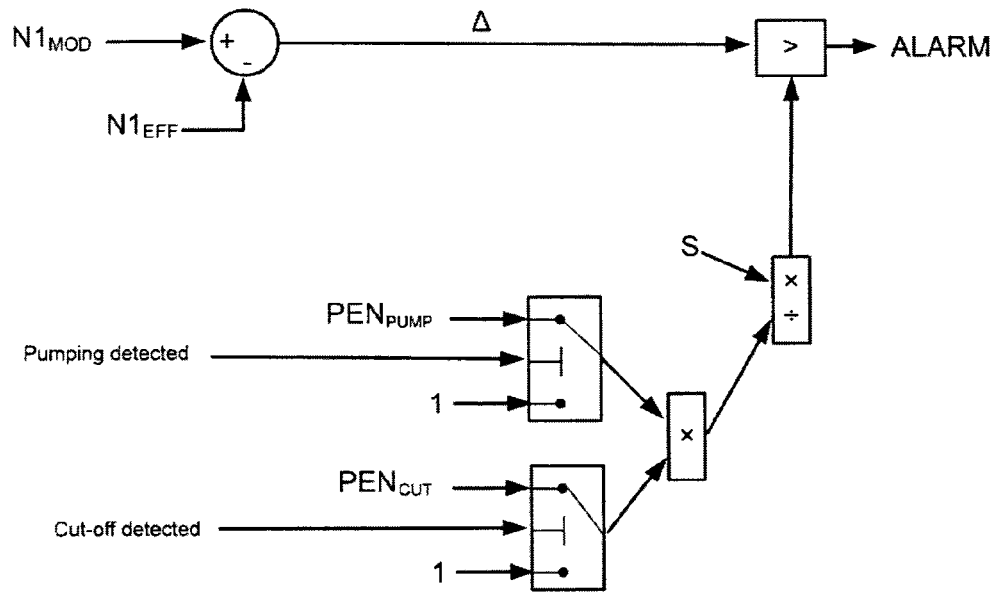
FIG. 8 is a schematic diagram of the parameterisation of the alarm threshold by detecting a pumping event and/or a cut-off event of the turbojet engine.

By way of example, with reference to FIG. 8, the turbojet engine may comprise means of detecting pumping of the turbojet engine in order to apply a pumping penalty parameter $PEN_{PUMP}$ to the alarm threshold S if such pumping is detected.

Similarly, still with reference to FIG. 8, the turbojet engine may comprise means of detecting a cut-off of the turbojet engine in order to apply a cut-off penalty parameter $PEN_{CUT}$ to the alarm threshold S if such a cut-off is detected.

In the example in FIG. 8, the penalty parameters $PEN_{PUMP}$ and $PEN_{CUT}$ are used in combination but it is self-evident that they could be applied independently to the alarm threshold S. Thus, if an auxiliary event that could affect the thrust is detected (pumping or cut-off), the value of the alarm threshold S is reduced in order to improve the sensitivity of the detection.

Furthermore, in a preferred embodiment of the invention, said penalty parameters $PEN_{PUMP}$ and $PEN_{CUT}$ may cancel the alarm threshold S in order to trigger an alarm directly.

d) Measuring the Change in Speed of the Low-Pressure Spool or the High-Pressure Spool Preferably, the method may comprise a step of measuring the speed of change of the difference $\Delta_{N1}$, $\Delta_{N2}$ during the transient phase, that is, the parameters $$\frac{d\Delta N1}{dt} \text{ or } \frac{d\Delta N2}{dt},$$

and a step of comparison to a predetermined threshold $S_{\Delta N1}$ or $S_{\Delta N2}$. Similarly, the penalty parameter may depend on the speed of change of the difference $\Delta_{N1}$, $\Delta_{N2}$, thus allowing the alarm threshold S to be modulated progressively.

Advantageously, this type of monitoring allows any thrust fault to be detected very reactively. A thrust fault causes an abnormal change of the difference $\Delta_{N1}$ or $\Delta_{N2}$ which can be rapidly detected.

e) Use of a Priority Alarm

In a preferred embodiment, the penalty parameters have a negative value for a method for monitoring an inadequate thrust. Thus, even if the thrust difference $\Delta$ is nil, an alarm can be emitted directly. In other words, a penalty parameter allows priority alarms to be triggered which are independent of the thrust difference $\Delta$. Advantageously, this allows a highly reactive monitoring method to be made available.

The auxiliary conditions monitored by the turbojet engine have been presented independently in FIGS. 6 to 8 but it is self-evident that they can be monitored in combination.

If a thrust fault is detected on a turbojet engine, the fault can be corrected with the aid of the other turbojet engine which is also in its transient phase by modifying its own thrust setting. Thus, the thrust is monitored and corrected in real time, thus increasing safety and reliability.

The invention claimed is:

1. A method for monitoring a thrust fault in an aircraft turbojet engine via an on-board computer of an aircraft when a thrust setting of said turbojet engine is modified, an effective thrust of the turbojet engine being modified during a transient phase to attain a desired thrust setting, said method comprising:
   processing the thrust setting via a filtering function and a transient-phase model, obtained using experience feedback from measurements taken on a same type of turbojet engine in order to obtain a modelled thrust;
   measuring the effective thrust;
   comparing said modelled thrust with said effective thrust in order to determine a thrust difference;
   comparing said thrust difference with an alarm threshold; and
   emitting an alarm in an event of said alarm threshold being exceeded;
   wherein, at a given iteration, in which a prior modelled thrust is known, the transient-phase model supplies a time constant from the prior modelled thrust, and the filtering function supplies a modelled thrust from the time constant obtained, the prior modelled thrust and the thrust setting.

2. The method according to claim 1, wherein the filtering function is initialized depending on a sign of the thrust difference when the turbojet engine is started, the prior modelled thrust being equal to the effective thrust of the turbojet engine during the initialization.

3. The method according to claim 1, wherein the filtering function is a low-pass function.

4. The method according to claim 1, wherein, as the turbojet engine comprises an idle-speed regulating device suitable for pre-empting a setting, defined via a throttle control lever, by an idle speed value that depends on determined ambient conditions of the turbojet engine, the method further comprises, for monitoring excess thrust, measuring at least one ambient parameter of the turbojet engine in order to define whether the throttle control lever setting is pre-empted by the idle speed value.

5. The method according to claim 4, further comprising determining a modelled idle speed value modelled via an idling model which associates a modelled idle speed value with one or more values of ambient parameters of the turbojet engine.

6. The method according to claim 5, wherein the idling model associates the modelled idle speed value with at least one of an ambient pressure of the turbojet engine and an ambient temperature of the turbojet engine.

7. The method according to claim 1, wherein the alarm threshold is a threshold that can be parameterised, and the method further comprising monitoring the state of at least one auxiliary condition of the turbojet engine, and applying a penalty parameter to said alarm threshold when an abnormal state of said at least one auxiliary condition is detected.

8. The method according to claim 7, wherein the penalty parameter is applied to said alarm threshold which depends on a criticality of the at least one auxiliary condition being monitored.

* * * * *

UNITED STATES PATENT AND TRADEMARK OFFICE
CERTIFICATE OF CORRECTION

PATENT NO. : 9,897,517 B2  
APPLICATION NO. : 14/432878  
DATED : February 20, 2018  
INVENTOR(S) : Cedrik Djelassi Page 1 of 1

It is certified that error appears in the above-identified patent and that said Letters Patent is hereby corrected as shown below:

In the Specification

Column 4, Line 11, change "thrust $N1_{EFF}$," to --thrust $N1_{EFF}$;--;

Column 7, Line 15, change "a step or comparing" to --a step of comparing--; and

Column 8, Line 11, change "the acceleration in" to --the acceleration--.

Signed and Sealed this  
Twenty-eighth Day of April, 2020

Andrei Iancu  
*Director of the United States Patent and Trademark Office*